N. W. DALTON.
AEROFOIL CONSTRUCTION.
APPLICATION FILED APR. 16, 1917.
1,296,775.
Patented Mar. 11, 1919.
2 SHEETS—SHEET 1.
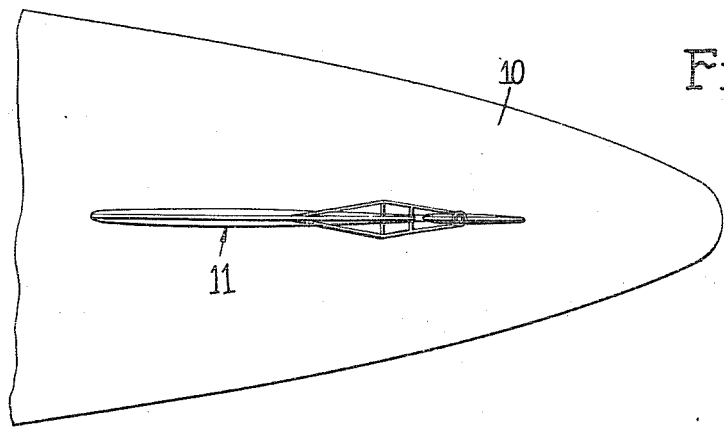
Fig.1.
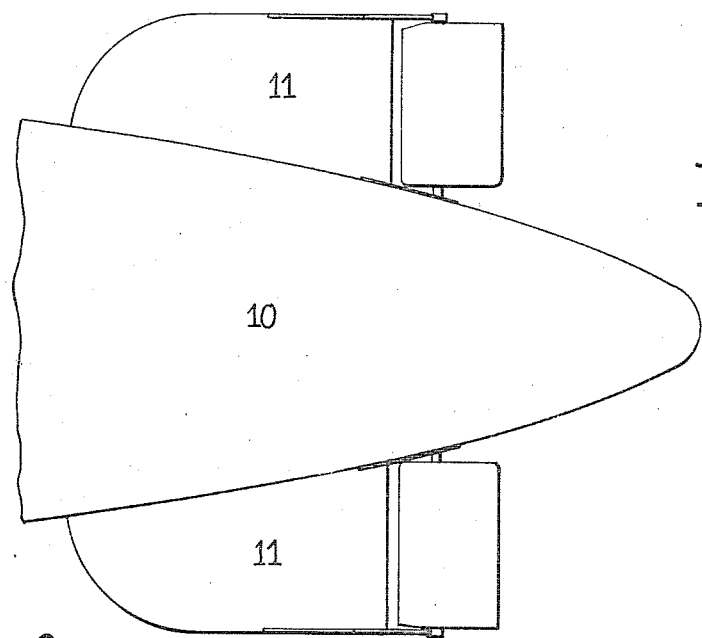
Fig.2.
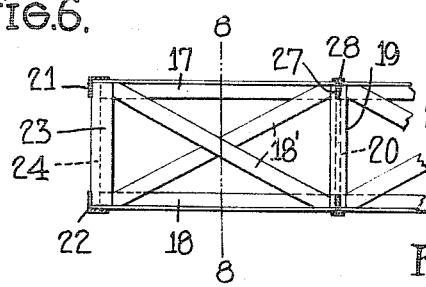
Fig.6.
Fig.8.
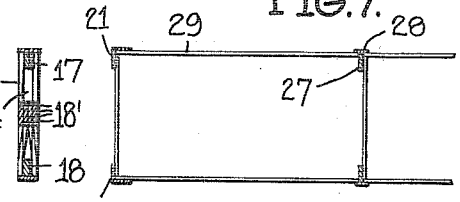
Fig.7.
Inventor
NELSON W. DALTON.
By
Attorney

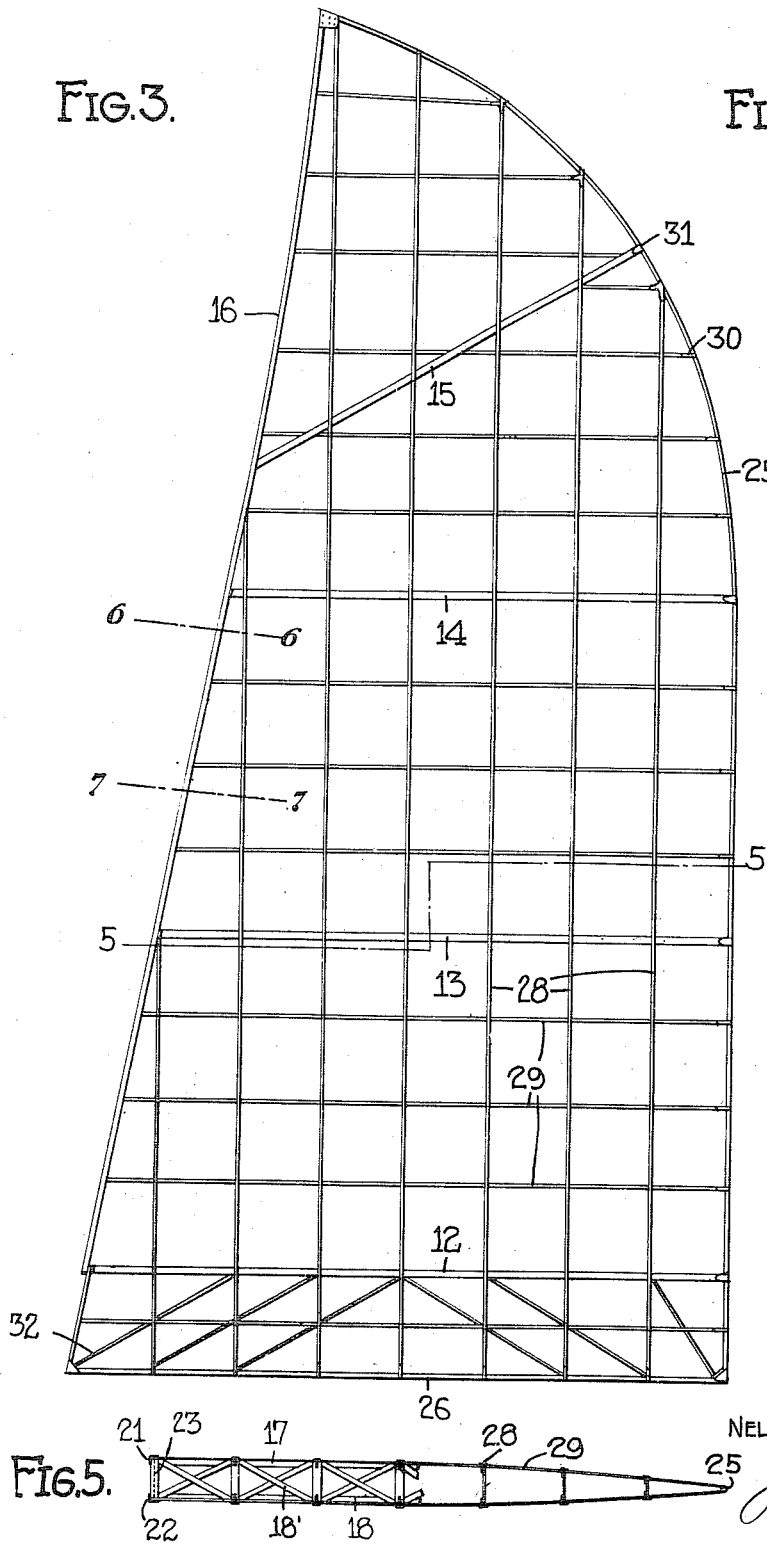
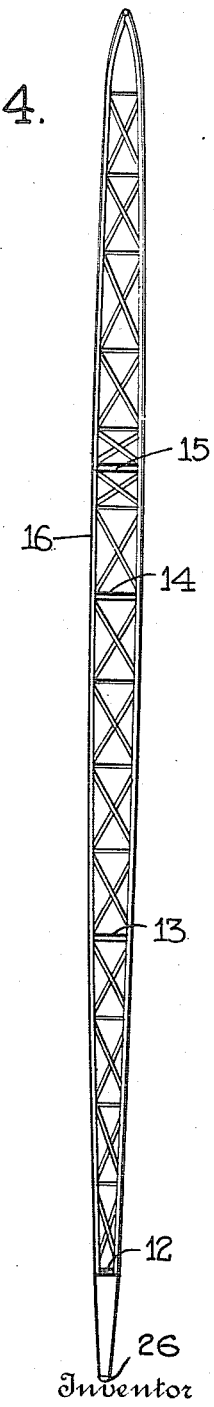
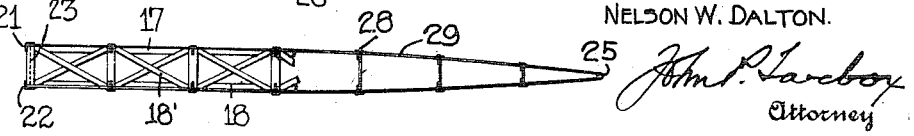

UNITED STATES PATENT OFFICE.

NELSON W. DALTON, OF BUFFALO, NEW YORK, ASSIGNOR TO CURTISS AEROPLANE AND MOTOR CORPORATION, A CORPORATION OF NEW YORK.

AEROFOIL CONSTRUCTION.

1,296,775.     Specification of Letters Patent.     Patented Mar. 11, 1919.

Application filed April 16, 1917. Serial No. 162,530.

*To all whom it may concern:*

Be it known that I, NELSON W. DALTON, a citizen of the United States, residing at Buffalo, in the county of Erie and State of New York, have invented certain new and useful Improvements in Aerofoil Construction, of which the following is a specification.

My invention relates to aircraft and more particularly to improvements in aerofoil construction. By way of illustration the stabilizing fins of a non-rigid self-propelled dirigible are portrayed. No limitation, however, in this connection is intended.

All aerofoil surfaces (control, stabilizing and supporting) except such as are of the warpable type must be absolutely rigid, extremely light and strong. Various types of supporting framework conducive to this end have been provided. Interconnected I-beams, box-beams, etc., have been used. None, however, in so far as I am aware, constructed along aeroplane lines, have been designed for use in connection with or are capable of use upon non-rigid dirigibles or "blimps" as they are commonly termed. This type of craft imposes upon aerofoil structures conditions quite different from the conditions to be met in aeroplane design. In the former a yielding support (the envelop or gas bag) for the aerofoil surface or surfaces is provided and in the latter a rigid or non-yielding support. In an aeroplane it is entirely practical to intertie and interbrace the opposed aerofoils while in a non-rigid dirigible the intertying or interbracing of the aerofoils cannot be effected. Moreover, in designing a non-rigid dirigible, sufficient rigidity must be given the separately supported aerofoils that they may individually withstand, without distortion, the racking strains imposed upon them by reason of their non-rigid support.

Realizing the unfitness and inadequacy of aerofoils of this type for use in connection with non-rigid dirigibles, a supporting framework including in its *ensemble* a plurality of connected transversely extending transversely latticed beams is used. These beams are interconnected and trussed effectually throughout. For this purpose a longitudinally extending transversely latticed beam is provided. Preferably said longitudinal beam lies contiguous to the outer surface of the envelop or gas bag that a very material area for contact or engagement therewith may be had. The aerofoil in the vicinity of said longitudinal beam is of maximum depth; the depth from said beam outwardly decreasing gradually. This construction gives to the aerofoil an almost perfect streamline form and at the same time provides for maximum depth where the greatest strength is required. Furthermore, the elements of the framework are characterized by constructional details which add materially to the strength and rigidity of the framework as a whole.

By the use of the term "aerofoil" all aeroplane surfaces are intended to be covered for it is obvious that the constructional features of the surface disclosed are applicable to aeroplane surfaces, control surfaces and stabilizing fins regardless of the connection in which they are used.

Of the drawings, wherein like characters of reference designate like or corresponding parts:

Figure 1 is a rear end elevation of a non-rigid dirigible or "blimp" equipped with stabilizing fins constructed in accordance with my invention;

Fig. 2 is a top plan view of that portion of the craft illustrated in Fig. 1;

Fig. 3 is an assembly view of the aerofoil supporting framework (a horizontal stabilizing fin being illustrated by way of example);

Fig. 4 is an inner edge view of the aerofoil illustrated in Fig. 3;

Fig. 5 is a section on the line 5—5 of Fig. 3;

Fig. 6 is an enlarged fragmentary section on the line 6—6 of Fig. 3;

Fig. 7 is a similar view on the line 7—7 of Fig. 3, and

Fig. 8 is a section on the line 8—8 of Fig. 6.

In the embodiment of the invention selected for illustration, 10 designates the envelop or gas bag of a non-rigid dirigible designed primarily for use in connection with coast or harbor patrol. The envelop is made preferably of rubberized fabric and contains hydrogen (or its equivalent) under sufficient pressure to maintain the rigidity of the envelop while the machine is in the air. A car or body (not shown) of fuselage form is suspended beneath the envelop. The car is intended to contain the power plant, fuel, ballast, personnel, etc. Furthermore, there is attached to the envelop vertical or horizontal fins and vertical and horizontal rudders, rip panels, maneuvering and safety valves, etc. The present invention, however, relates only to the stabilizing fins. Said fins are each designated as an entirety by the numeral 11.

Appropriately spaced transversely extending transversely latticed beams 12, 13, 14 and 15 together with a single longitudinally extending transversely latticed beam 16, constitute a foundation for the supporting framework of the fin. The beam 16 lies preferably contiguous to the outer surface of the envelop 10, the curvature of said beam and the curvature of said surface at the point of attachment of the fin 11 being the same. The beams 12, 13, 14 and 15 are of varying length in the embodiment of the invention shown and also of varying depth, such beam or beams as are located remote from the leading and trailing edges of the fin being the deeper although in each instance said beams taper outwardly to an edge (Fig. 5). Upon reference to Fig. 6 it will be noted that each beam comprises a top chord 17 and a bottom chord 18 of T-form in cross section, cross arranged braces 18' and vertically extending strips 19 which interconnect said chords. The braces 18' terminally abut the spaced strips 19 of which there are preferably two at each station of the beam, the braces being disposed preferably although not necessarily at each side of the web portion of the chords 17 and 18. The strips 19 considered in connection with a filler-strip 20 constitute chord-connecting strips of I-form in cross section. The cross arranged braces, the T-formed chords, and the I-form chord-connecting strips collectively constitute a beam of maximum strength and minimum weight—the characteristics essential to the production of a supporting framework best adapted for aircraft.

The longitudinal latticed beam 16, unlike the transverse beams 12, 13, 14 and 15 comprises top and bottom chords 21 and 22 of right angle form in cross section, cross arranged braces 23 located within the angle of said chords and interconnecting vertical strips 24 against which said braces 23 terminally abut. The strips 24 of the longitudinally extending beam lie contiguous to the corresponding inner end strips 19 of the transversely extending beams. Said transversely extending beams abut at their inner ends the longitudinally extending beam and (see Fig. 6) in depth correspond to the depth of said longitudinal beam, the depth varying, however, according to the location of the particular transverse beam.

Said transverse beams at their outer ends or at their points of minimum depth are interconnected by an outer edge strip 25 (metal preferred) longitudinally curved to correspond to the form given the fin in its design. Upon reference to Fig. 3 it will be noted that the said strip 25 extends outwardly and thence rearwardly from the forward end of the longitudinal beam 16 to the outer end of the trailing edge strip 26 shown in the selected embodiment of the invention as extending at a right angle to the line of flight. Said strip 26 is disposed aft of the rearmost transverse beam 12 a sufficient distance to carry the framework of the fin rearwardly beyond said beam to an edge and in substantially streamline form. In addition, the supporting framework comprises longitudinally extending ribs or frames 27, cap strips 28, likewise longitudinally extending, and transverse stringers 29. The stringers 29 extend from the longitudinal beam 16 to the outer edge strip 25, said stringers in each instance being arranged in pairs (see Fig. 7) for outward convergence in streamline form. The ribs 27 and cap strips 28 are also arranged in pairs to intersect the stringers 29 at right angles. Said elements are terminally fastened to either the outer edge strip 25 or the longitudinal beam on the one hand and to the trailing edge strip 26 on the other. Moreover, said elements, except such as terminate at a point in engagement with the beam 16, taper or converge both fore and aft. There is thus evolved a supporting framework of maximum depth in the vicinity of the longitudinal beam 16 and in the vicinity of the centrally located transverse beam 14 where greatest strength is required, the depth, outwardly from said beam 16 and forwardly and rearwardly from said beam 14 decreasing gradually in such manner that the margins of the aerofoil, except the inner or abutting edge terminate in an edge. Metallic lap joint fittings 30, brazed or welded to the strip 25, or the strip 26 as the case may be, are utilized as the fastening means for the stringers 29 and for the cap strips 28. Similar fastening devices 31 are used for fastening the outer edge strip 25 to the transverse beams.

By constructing the aerofoil supporting framework after the manner disclosed a very material engaging area is provided at the inner edge of the aerofoil (the area being equal to the depth of the longitudinally extending transversely latticed beam) for contact with the envelop 10 to which the aerofoil or fin is rigidly fastened by appropriate straps or other devices (not shown). This increased engaging area adds materially to the absolute rigidity so essential in the construction of an aerofoil for non-rigid dirigibles or "blimps". An interbracing or intertying of the opposed fins or aerofoils cannot be effected as in an aeroplane.

For increased strength at the trailing edge of the fin or aerofoil, diagonal braces 32 are provided. These braces interconnect the trailing edge strip 26 and the rearmost transverse beam 12, said braces being alternately arranged with respect to the top and bottom edges of the beam 12 to effectually truss said beam in a manner conducive to maximum strength. Furthermore, the transverse trussing of the several beams is such that the severe racking strains which tend to distort the areofoil are effectually withstood and perfect rigidity throughout the entire area of the fin insured.

As intimated hereinbefore the adaptation of an aerofoil constructed as herein set forth is not limited to non-rigid dirigibles although admittedly a construction such as disclosed is best adapted to this type of machine. By very slight modification in some instances and without modification under other circumstances the supporting framework of the aerofoil disclosed may be utilized for supporting the aeroplanes of heavier-than-air craft, the directional control surfaces of both heavier and lighter-than-air craft as well as the fixed stabilizing surfaces of each. Under all circumstances the framework is to be completely covered with appropriate fabric (doped linen preferred).

What is claimed is:

1. An aerofoil surface for aircraft including a plurality of intersecting longitudinally extending and transversely extending members, the longitudinally extending members comprising top chords and bottom chords and the transversely extending members comprising top chords and bottom chords, and connections between the chords of the longitudinally extending members located at the points of intersection of the transversely extending members whereby said connections jointly function as connections between the chords of the transversely extending members.

2. An aerofoil surface for aircraft including a plurality of intersecting longitudinally extending and transversely extending members, the longitudinally extending members comprising top and bottom chords of substantially T-shape in transverse section and the transversely extending members comprising top and bottom chords, and connections between the chords of the longitudinally extending members located at the points of intersection of the transversely extending members whereby said connections jointly function as connections between the chords of the transversely extending members.

3. An aerofoil surface for aircraft comprising a plurality of latticed beams comprising top and bottom chords of substantially T-shape in transverse section, vertically extending connections between the opposed chords, cross arranged connections between adjacent vertical connections, together with a plurality of intersecting members comprising top and bottom chords, the arrangement of the intersecting members being such that the vertical connections between the chords of the beams jointly function as connections between the chords of the intersecting members.

4. An aerofoil surface for aircraft including a longitudinally extending transversely latticed beam of maximum depth at a point intermediate its ends, the depth of the beam, both fore and aft, decreasing gradually to an edge, a plurality of transversely extending similarly latticed beams fastened at one end to said longitudinal beam, the transverse beams being likewise of gradually decreasing depth, the decrease in depth being however only toward one end, and a plurality of intersecting longitudinally extending and transversely extending cap strips and stringers, the arrangement of the several strips and stringers being such that that portion of the aerofoil surface laterally out from the longitudinal beam, and intermediate the several transverse beams is effectually trussed and the transverse beams interconnected.

5. An aerofoil surface for aircraft including a longitudinally extending transversely latticed beam, a plurality of longitudinally extending members, each member comprising opposed chords, a plurality of transversely extending transversely latticed beams, said transverse beams being fastened to the longitudinal beam and comprising top and bottom chords having vertical interconnections and cross arranged interconnections, the vertical interconnections being so arranged relatively to the intersecting members as to enter into and constitute a part thereof.

6. An aerofoil surface for aircraft comprising a plurality of transversely extending transversely latticed beams, each beam comprising a top chord and a bottom chord, vertically extending connections between the opposed chords, and a plurality of cross arranged strips, one pair of cross arranged strips being provided between adjacent vertical connections, and a plurality of longitudinally extending members arranged to intersect the transverse beams, said members comprising opposed chords, and being so relatively arranged that the vertical interconnections of the transverse beams line up with the chords of the longitudinally extending members and enter thereinto as structural elements thereof.

In testimony whereof I hereunto affix my signature.

NELSON W. DALTON.